United States Patent
Shirani

(10) Patent No.: US 7,583,724 B2
(45) Date of Patent: Sep. 1, 2009

(54) LOW-POWER MIXED-MODE ECHO/CROSSTALK CANCELLATION IN WIRELINE COMMUNICATIONS

(75) Inventor: Ramin Shirani, Morgan Hill, CA (US)

(73) Assignee: Aquantia Corporation, Milpitas, CA (US)

( * ) Notice: Subject to any disclaimer, the term of this patent is extended or adjusted under 35 U.S.C. 154(b) by 732 days.

(21) Appl. No.: 11/006,329

(22) Filed: Dec. 6, 2004

(65) Prior Publication Data

US 2005/0123081 A1   Jun. 9, 2005

(51) Int. Cl.
*H04B 1/38* (2006.01)
*H04L 5/16* (2006.01)
*H04L 1/00* (2006.01)

(52) U.S. Cl. .................... 375/219; 375/350; 370/286; 379/406.08; 379/416; 379/417

(58) Field of Classification Search ............... 375/346, 375/350, 219; 370/301, 286, 292, 291; 455/63.1, 455/295, 296; 379/406.01, 406.06, 406.08, 379/417, 416

See application file for complete search history.

(56) References Cited

U.S. PATENT DOCUMENTS

| 6,829,314 B1 * | 12/2004 | Zortea et al. ............... 375/346 |
| 6,980,644 B1 * | 12/2005 | Sallaway et al. ........ 379/406.01 |
| 7,187,719 B2 * | 3/2007 | Zhang ........................ 370/286 |
| 2004/0120391 A1 * | 6/2004 | Lin et al. .................... 375/219 |

* cited by examiner

*Primary Examiner*—Betsy L Deppe
(74) *Attorney, Agent, or Firm*—Sawyer Law Group P.C.

(57) ABSTRACT

A signal processing system includes an AGC and pre-echo cancellation system for receiving an analog signal, amplifying signal magnitude (over all frequencies) to a pre-determined level by AGC, and removing the immediate transmit pulse from this received signal by pre-echo canceller to provide a second analog signal. The signal processing system also includes a summer for receiving the analog signal; a feed forward equalization (FFE) unit for receiving a signal from the summer; and a slicer for receiving a signal from the FFE unit and providing an output signal. The signal processing system also includes an Echo and NEXT or FEXT cancellation system for receiving the output signal and for providing a signal to the summer for canceling the echo and crosstalk in the signal processing system. The Echo and crosstalk components associated with a signal processing system can be subtracted prior to the FFE.

13 Claims, 4 Drawing Sheets

US 7,583,724 B2

LOW-POWER MIXED-MODE ECHO/CROSSTALK CANCELLATION IN WIRELINE COMMUNICATIONS

FIELD OF THE INVENTION

The present invention relates generally to wireline communications and more particularly to a system and method to cancel echo and crosstalk in such communications.

BACKGROUND OF THE INVENTION

In a wireline communication channel, where multiple signals are sent over multiple wires, the wires can be electromagnetically coupled to one another and result in an interference from one channel to another, so called near end Xtalk (NEXT) or far end Xtalk (FEXT). At the same time signals traveling in a channel can reflect back off of the imbalances in the channel and interfere with itself, so called signal echo. In most communication systems, a cancellation scheme should exist to cancel out the effect of signal echo and crosstalk from adjacent lines to achieve an acceptable bit error rate (BER), Echo and Xtalk (i.e., NEXT AND FEXT) cancellation is possible as the system has the information about the bits sent and the bits received.

The typical method to cancel the effect of echo and Xtalk in communication theory is using finite impulse response (FIR) FILTERS. The conventional method of performing echo and Xtalk cancellation using FIR filters is done fully in digital domain (other than the pre-echo cancellation for the immediate transmit pulse), where the calculated digital value of echo and Xtalk by the FIR filter is subtracted from the incoming noisy analog data input, which is digitized by an analog-to-digital conveffer (ADC).

FIG. 1 illustrates a conventional digital signal processing system 10 for a four-channel bi-directional wireline communication. In system 10 an automatic gain control (AGC) pre-echo unit 12 receives an input signal from a receiver (Rx). The signal from the pre-echo cancellation unit 12 is provided to an A/D converter 14. The digital signal from the A/D converter 14 is provided to a feed forward equalization (FFE) unit 16. The signal from the FFE unit 16 is provided to the summer 18. The output from the summer 18 is provided to slicer 20. The output of the slicer 20 is provided to a data decoder 22. The output of the slicer is also provided to an input of an Echo canceller 24 and a plurality of NEXT cancellers 26, 28,30 (for the sake of simplicity, whenever NEXT cancellers are referred to, it is meant to also include FEXT cancellers). The Echo canceller 24 receives a transmit (Tx) signal from output channel 1. The plurality of NEXT cancellers 26, 28, 30 receive Tx signals from output channels 2-4 respectively. The system can also be used to perform FEXT cancellation by a plurality of FEXT cancellers that receive as their input from the output of the slicer.

In this embodiment, the Rx signal has been distorted due to the impairments of the channel including inter-symbol interference (ISI), addition of Near End & Far End crosstalk from coupling from other transmit channels and echo of its own transmitter. The signal typically goes through the AGC to adjust signal amplitude levels, and a local echo canceller to approximately remove the immediate transmit signal, the major echo amplitude, from the received signal. System 10 requires a high resolution analog-to-digital converter (A/D 14), which translates the signal to high resolution digital information which is then equalized digitally through digital filters (possibly a Feed Forward Equalizer 16, or a Feed Back Equalizer). Furthermore, the data is detected by slicer 20 and the data error is calculated (as an example through an LMS algorithm) which in turn sets the coefficients of the appropriate FIR filter for Echo, NEXT, and FEXT cancellers. The output of the FIR filters is subtracted from the signal prior to the slicer 20. The data decoder 22 represents possible additional data decoding, which is protocol dependent, may be required to completely decode the signal for increased performance.

The typical method to cancel the effect of echo and Xtalk in communication theory is using finite impulse response (FIR) filters. The conventional method of performing echo and Xtalk cancellation using FIR filters is done fully in digital domain (other than the pre-echo cancellation for the immediate transmit pulse), where the calculated digital value of echo and Xtalk by the FIR filter is subtracted from the incoming noisy analog data input, which is digitized by an analog-to-digital converter (ADC). The digital approach, however, can have a significant complexity if the size of the FIR filters is large and thus results in large power and area on the silicon.

Accordingly, what is needed is a system and method for addressing the above-identified issues. The system and method should be cost effective, adaptable to and easily implemented existing processing systems.

The present invention addresses such a need.

BRIEF SUMMARY OF THE INVENTION

A signal processing system is disclosed. The signal processing system comprises an AGC and pre-echo cancellation system for receiving an analog signal, amplifying signal magnitude (over all frequencies) to a pre-determined level by the AGC, and removing the immediate transmit pulse from this received signal by a pre-echo canceller. The signal processing system further comprises a summer for receiving the analog signal; a feed forward equalization (FFE) unit for receiving a signal from the summer; and a slicer for receiving a signal from the FFE unit and providing an output signal. The signal processing system also comprises an Echo and NEXT (possibly FEXT) cancellation system for receiving the output signal and for providing a signal to the summer for canceling the Echo and crosstalk in the signal processing system.

Accordingly, in a system and method in accordance with the present invention the Echo and crosstalk components associated with a signal processing system can be subtracted prior to the FFE. This allows for a practical analog implementation of a FFE filter and subsequent analog elements. With the Echo and NEXT removed there is more dynamic range allowable for the signal; furthermore NEXT and Echo are of high frequency nature and if not removed will get significant boost by the FFE filter which will limit the dynamic range of not only the FFE, but also the follow on analog circuits. This system can be utilized to great advantage in low power CMOS designs where supply voltages are limited.

DETAILED DESCRIPTION OF THE INVENTION

The present invention relates generally to wireline communications and more particularly to a system and method to cancel echo and crosstalk in such communications. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
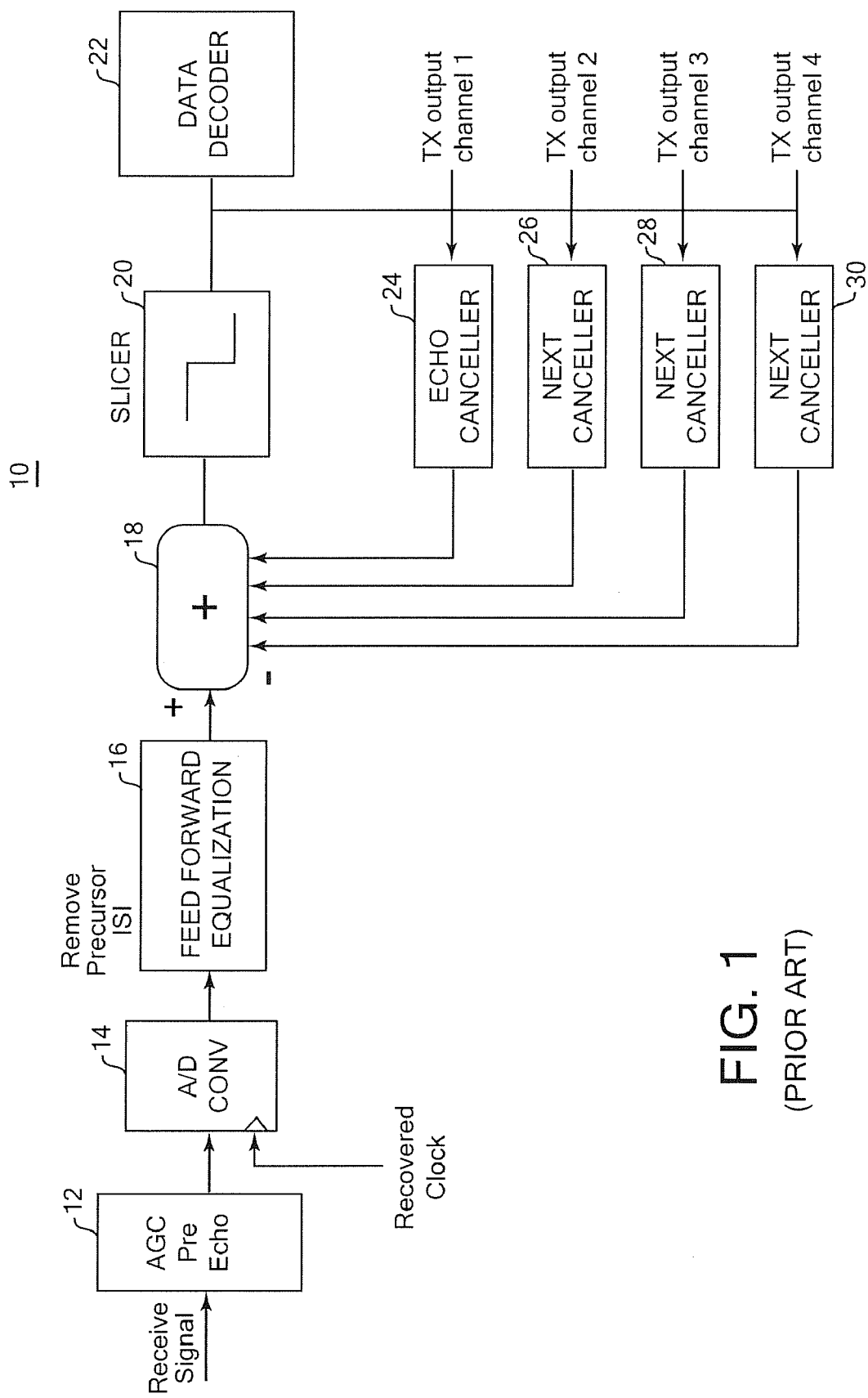
FIG. 1 illustrates a conventional signal processing system.
Figure 2:
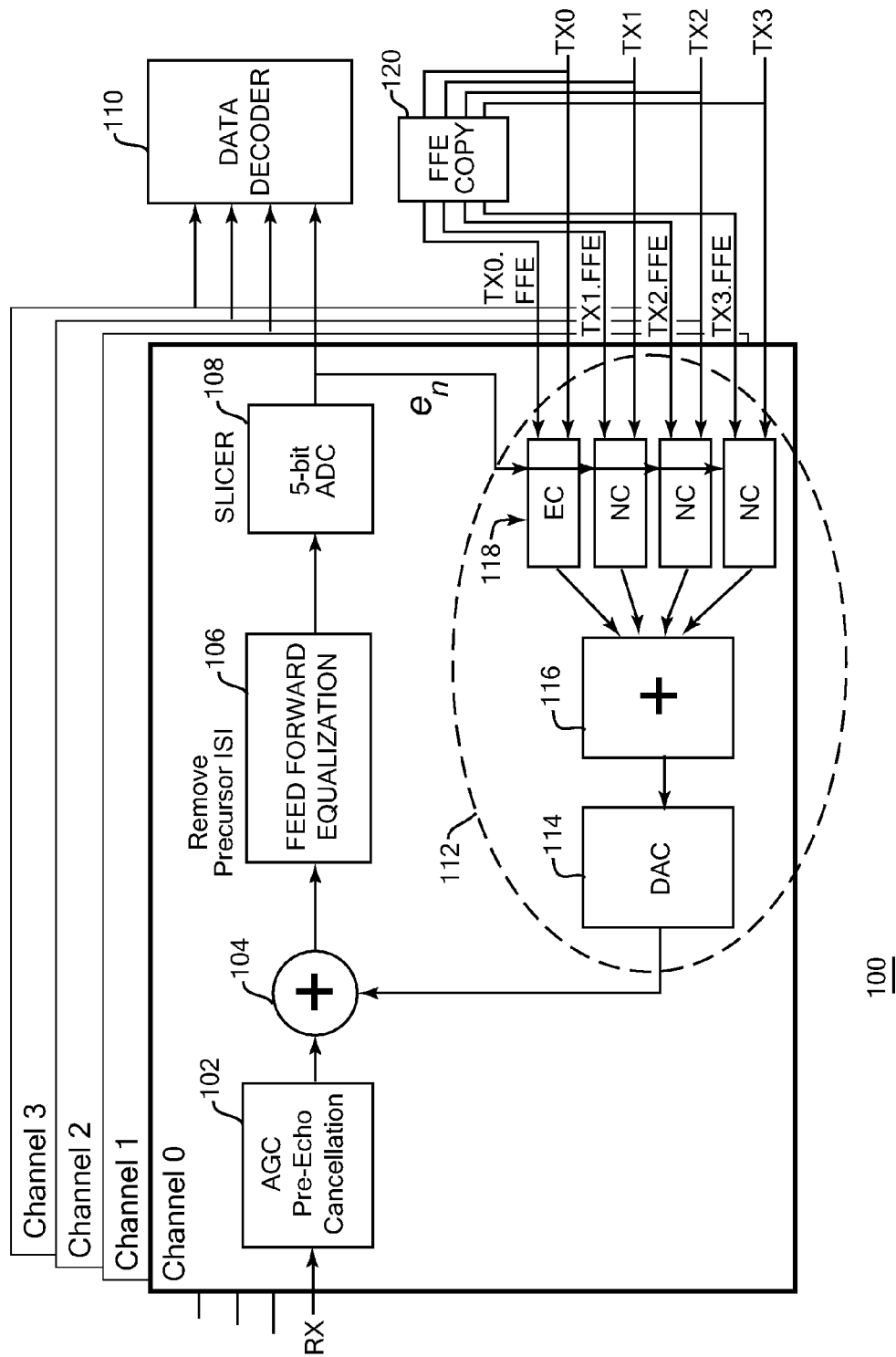
FIG. 2 illustrates a signal processing system in accordance with the present invention.

FIG. 2 illustrates a signal processing system 100 in accordance with the present invention. The receive signal is provided to AGC pre-echo canceller unit 102. This signal in turn is provided to summer 104. The signal from the summer 104 is provided to the FFE 106. The FFE 106 provides its signal to a slicer 108. The output of the slicer 108 can be provided to the data decoder 110 and to an ECHO and NEXT canceller system 112. The output of the Echo and NEXT canceller system 112 is provided to the summer 104. Similar to the system 10 of FIG. 1 the Rx signal goes through the AGC pre-echo canceller unit 102. A high resolution ADC is eliminated, and the signal now goes through an analog FFE 106, and is sliced by a low resolution ADC 108, in the case of a data decoder needed after the FFE. Since the signal is not digitized, the Echo, NEXT (and FEXT) needs to be subtracted in an analog fashion, for example through current subtraction. The output of the slicer is also fed to canceller blocks 118 that calculate the tap coefficients of the FIR filter used in FFE, Echo, and crosstalk cancellers.

With this embodiment it is now advantageous for Echo, NEXT and FEXT to be subtracted prior to the FFE in a practical analog implementation, to allow for a reasonable dynamic range of the signal through the FFE and potential subsequent analog elements. This is especially true for lower power CMOS designs where supply voltages are limited to 3.3V, 2.5V, or lower.

Figures 4A, 4B:
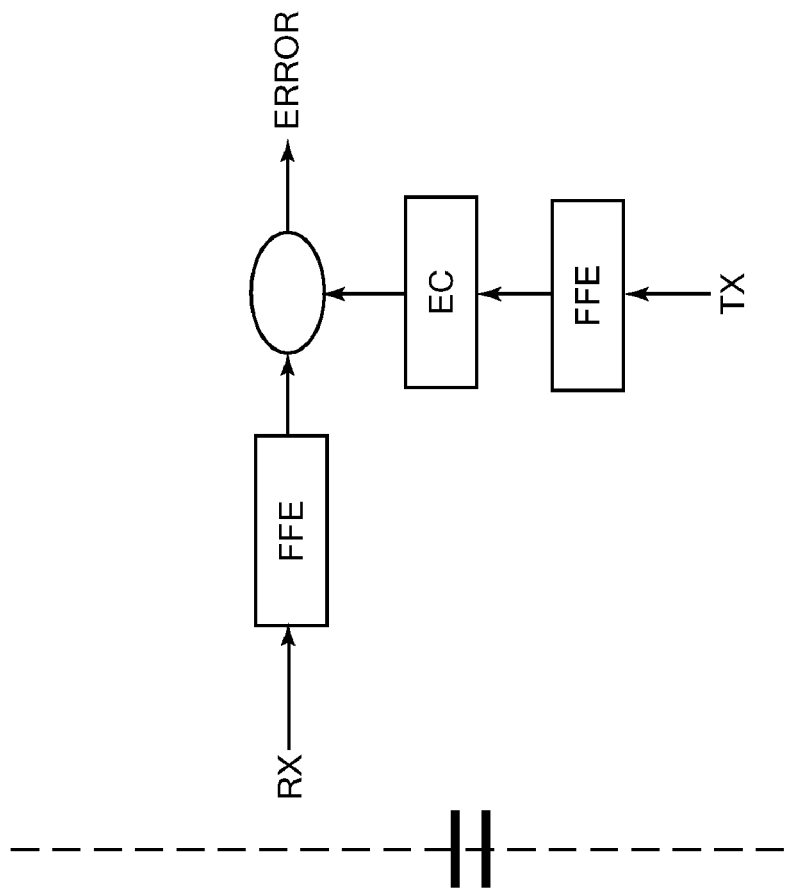
FIG. 4A is a topology of an Echo and NEXT cancellation system which has a correlated error signal.
FIG. 4B is an equivalent topology for providing Echo and NEXT cancellation where the error signal is not correlated.

However, since the Echo, NEXT, and FEXT are cancelled before the FFE, the conventional LMS (least mean square) algorithm is not applicable to this topology to automatically adapt the tap weights, as the error is filtered (or conelated) by FFE. FIG. 4A is a topology of an Echo and NEXT cancellation system 10 which has a correlated error signal.

FIG. 4B is an equivalent topology for providing Echo and Next cancellation where the error signal is not correlated. FIG. 4B illustrates that a filtered transmit signal is required for tap coefficient calculations in accordance with the below identified equation 1.

$$\text{where } W_{n+1}(k) = W_n(k) + \mu e(FFE[TX])\qquad\text{Equation 1,}$$

In this equation, W is the value of the coefficients used for the cancellation (i.e., Echo, NEXT or FEXT). The $W_{n+1}$ is the subsequent coefficient value. "$\mu$" is a small constant usually less than one, that determines the rate of adaptation/convergence. "$e_n$" is the value of the error at the slicer unit. FFE[TX] represents the resulting data output obtained by applying (passing) the transmit data through a simple copy of Feed Forward Equalizer FFE. Accordingly, the subsequent coefficient value is calculated by adding the previous value ($W_n$) to $\mu$ multiplied by $e_n$ and the results multiplied by FFE[TX].

This equation indicates that the input to each of the cancellers (being the transmit data) needs to now pass though a copy of an FFE before feeding the appropriate Echo, NEXT, and FEXT cancellers' adaptive engine for coefficient calculations. This copy of the FFE is fully digital and only needs to be an approximate copy of the analog FFE used in the data path, which significantly relaxes the matching requirements between a digital and analog FIR. Further more, it is much simpler than the actual FFE in the receive path, because the inputs to it are a finite number of transmit state. For example, in a PAM5 signaling the possible states of the transmitter is bounded to −2, −1, 0, 1, 2. It should be however noted that the inputs of the actual Echo and NEXT canceller filters are directly fed by the transmit digital outputs without any filtering by the FFE.

The Echo, NEXT, and FEXT cancellers could be constructed in one of two ways:

1. Hybrid: The cancellers are in digital and the final summation of all cancellers passes through a digital-to-analog converter and subtracted as shown.

Figure 3:
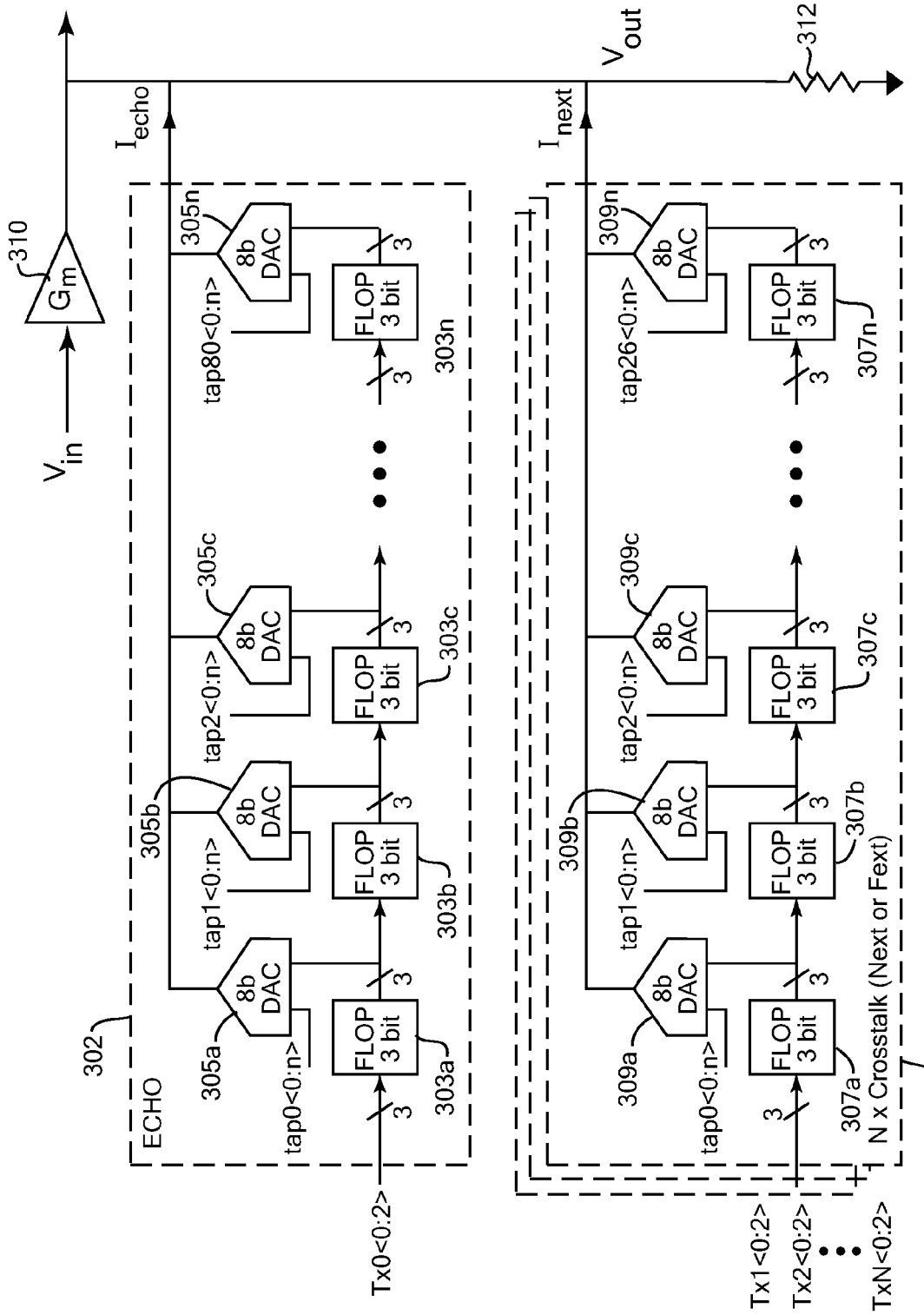
FIG. 3 is a diagram of a FIR filter in accordance with the present invention.

2. Mixed signal: Where the multiplication is done through DACs, and summation through current summing. The Mixed-signal implementation results in significant power saving in schemes with large number of FIR taps, as it eliminates the digital multipliers and adders that typically have high bit resolution. To describe an all analog FIR filter refer to the following. FIG. 3 is a diagram of a FIR filter 300 in accordance with the present invention. The analog FIR filter 300 comprises an Echo stage 302 and a NEXT or FEXT stage 304. The Echo stage 302 includes a plurality of flip flops (FFs) 303a-303n. Each of the FFs 303a-303n is coupled to a DAC 305a-305n respectively. The NEXT or FEXT stage 304 includes a plurality of flip flops (FFs) 307a-307n. Each of the FFs 307a-307n is coupled to a DAC 309a-309n respectively. The output of the Echo stage 302 provides a first current Iecho. The output of the NEXT or FEXT stage 304 provides a second current Inext. These outputs of the stages 302 and 304 are coupled to an output of an amplifier 310. The outputs of the stages 302 and 304 are also coupled to a resistor 312 which is coupled to ground. Although in this embodiment, the resistor 312 is coupled to ground, one of ordinary skill in the art readily recognizes that the resistor can be terminated in a variety of ways, including but not limited to, a supply voltage, a voltage source, virtual ground and the like and that would be within the spirit and scope of the present invention.

In a system and method in accordance with the present invention, a FIR filtering technique is implemented in a mixed signal fashion. There are three main functions that are required by a FIR filter, an accurate delay block (equal to a symbol period or an integer fraction of it), a multiplier (that multiplies the data/symbol value with a filter tap weight), and an adder (that adds all the multiplied values and subtracts them from the main data). In this embodiment, the delay block is implemented by clocked flip flop stages, so as long as the clock period is equal to or a fraction of the symbol rate, we can generate accurate delays in the digital domain.

The multiplication is performed with a digital-to-analog converter (DAC) where output current of the DAC is set by the tap weight and modulated by the symbol value (or vice versa). Therefore, the multiplication function hardly needs any logic and can be performed all in a DAC stage. The last function of summation/subtraction is simply done by current summing the output currents of all the DACs in same or opposite direction. This can be done either by sourcing and sinking current from the common current summing node in a single-ended design, or by just sourcing current to either branch of a differential scheme. The final summed output currents of the DACs are also summed with the analog input data (in form of current) and sent to the resistor 312 to be converted to a voltage.

As can be seen the summation and subtraction function require no extra stage or burn no extra power and simple done by current summing of the DAC outputs. The multiplication and summation that is mainly done in analog domain results in significant power saving that differentiates this scheme from the digital approach. It should, however, be noted that all DACs must have enough resolution to accurately cancel echo and Xtalk effect. The resolution of the DAC vary depending on the strength of each of this interference components and thus each DAC can be optimized for its resolution.

At the same time, as the current summing node can turn out to be highly capacitive, as it is shared by many stages, it can slow down the current summing process and the output voltage does not settling to its final value within a symbol time. To address this problem, this invention also proposed an equalization scheme that solves the low-passing effect of the capacitive output node.

The equalization applies pre-emphasis to each DAC outputs, so that in the beginning of each symbol period that DAC changes its value, the DAC sources/sinks a higher current value than its target for a limited time less than symbol period and then switches to its final value. The amount of time that the output current is preemphasized is directly proportional to the RC of the summing node and should be determined for each application and process technology.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A signal processing system comprising:
   a summer for receiving an input signal and an interference cancelling signal;
   a first feed forward equalization (FFE) unit for receiving a signal from the summer;
   a slicer for receiving a signal from the FFE unit and providing an output signal;
   a second FFE unit that is simpler than the first FFE unit in operation due to processing as input a finite number of states of input transmit signals, the second FFE unit filtering the input transmit signals and outputting filtered transmit signals; and
   a cancellation system for receiving the filtered transmit signals and for providing the interference cancelling signal to the summer for cancelling transmit signal interference in the signal processing system.

2. The signal processing system of claim 1 wherein the cancellation system operates in an analog domain.

3. The signal processing system of claim 1 wherein the slicer comprises a low-resolution analog-to-digital converter (ADC).

4. The signal processing system of claim 1 wherein the cancellation system is a mixed signal system comprising:
   a digital delay pipeline for receiving the input transmit signals, the transmit signals being digital, the digital delay pipeline delaying the transmit signals;
   a plurality of digital-to-analog converters (DACs) with shared output nodes, each of the DACs receiving its input from the digital delay pipeline and performing a multiplying function including modulating a tap coefficient with data from the input transmit signals.

5. The signal processing system of claim 4 wherein outputs of the DACs are in the form of current, and wherein summation of the outputs of the DACs is performed by current summing the outputs of the DACs.

6. The signal processing system of claim 5 wherein the DACs provide signal pre-emphasis to the outputs of the DACs to reduce a settling time error at the shared output nodes of the DACs.

7. The signal processing system of claim 1 wherein the cancellation system comprises a hybrid analog/digital system.

8. The signal processing system of claim 1 wherein coefficient calculations for the cancellation of the transmit signal interference are performed in accordance with the following equation: $W_{n+1}(k)=W_n(k)+\mu e_n(FFE[TX])$ wherein "$\mu$" is a small constant usually less than one, that determines the rate of adaptation/convergence, "$e_n$" is the value of the error at the slicer unit, and FFE[TX] represents one of the filtered transmit signals.

9. The signal processing system of claim 1 wherein the cancellation of transmit signal interference in the signal processing system is performed using current summing, in which output currents of DACs of the cancellation system are summed to provide a total current to subtract from the input signal.

10. The signal processing system of claim 1 further comprising a pre-echo cancellation system and an automatic gain control (AGC) for receiving a receiver signal and providing the input signal to the summer.

11. The signal processing system of claim 1 wherein the cancellation system is an echo and crosstalk cancellation system for providing the interference cancelling signal, and wherein the transmit signal interference includes echo and crosstalk.

12. The signal processing system of claim 1 wherein the first FFE unit is an analog FFE unit.

13. The signal processing system of claim 1 wherein the second FFE unit is a digital FFE unit.

* * * * *